(12) United States Patent
Lewin et al.

(10) Patent No.: US 9,158,182 B1
(45) Date of Patent: Oct. 13, 2015

(54) SUSPENSION ARRANGEMENT, AND A MONITORING DEVICE HAVING A SUSPENSION ARRANGEMENT

(71) Applicant: Axis AB, Lund (SE)

(72) Inventors: Niclas Möller Lewin, Malmö (SE); Jens Pahlitzsch, Lund (SE); Johan Bergsten, Landskrona (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 14/698,305

(22) Filed: Apr. 28, 2015

(30) Foreign Application Priority Data

Apr. 30, 2014 (EP) .................................... 14166574

(51) Int. Cl.
| | | |
|---|---|---|
| G02B 17/00 | (2006.01) | |
| G03B 17/56 | (2006.01) | |
| F16B 45/04 | (2006.01) | |
| F16M 13/02 | (2006.01) | |
| H04N 5/225 | (2006.01) | |

(52) U.S. Cl.
CPC .............. *G03B 17/561* (2013.01); *F16B 45/04* (2013.01); *F16M 13/02* (2013.01); *H04N 5/2252* (2013.01)

(58) Field of Classification Search
USPC .................. 396/427; 248/187.1; 348/143, 144
See application file for complete search history.

(56) References Cited

U.S. PATENT DOCUMENTS

| 1,634,578 | A | | 7/1927 | Hummell |
|---|---|---|---|---|
| 3,323,770 | A | * | 6/1967 | Wolar ............................ 248/345 |
| 3,378,221 | A | * | 4/1968 | Wolar et al. ................... 248/343 |
| 5,038,262 | A | | 8/1991 | Mechtler |
| 6,561,676 | B1 | | 5/2003 | Fischer et al. |

FOREIGN PATENT DOCUMENTS

| CN | 202 981 457 U | 6/2013 |
|---|---|---|
| DE | 88 02 408 | 6/1989 |
| JP | H10 127988 | 5/1998 |

* cited by examiner

*Primary Examiner* — Clayton E Laballe
*Assistant Examiner* — Warren K Fenwick
(74) *Attorney, Agent, or Firm* — Volpe and Koenig, P.C.

(57) ABSTRACT

An assisting suspension arrangement for suspending a monitoring device, comprising a hook member, a blocking member, and a resilient member is disclosed. The suspension arrangement is configured to adopt an open state and a closed state. The suspension arrangement is configured such that when the monitoring device is suspended by the suspension arrangement, the hook member is adapted to carry the weight of the monitoring device and thereby to move toward the open state; and such that when the load of the weight of the monitoring device is released from the hook member, the resilient member is adapted to move the hook member toward the closed state. A monitoring device comprising such a suspension arrangement is also disclosed.

14 Claims, 6 Drawing Sheets

SUSPENSION ARRANGEMENT, AND A MONITORING DEVICE HAVING A SUSPENSION ARRANGEMENT

FIELD OF INVENTION

The invention relates to a suspension arrangement, in particular an assisting suspension arrangement for suspending a monitoring device.

BACKGROUND

A suspension arrangement may be used in various applications for providing suspension of devices such as equipment, fixtures or decorations. The suspension may be temporary, such as when moving a piece of equipment by a crane, or permanent such as when installing a lamp by suspending it in a ceiling.

One type of suspension arrangement is adapted for suspending a monitoring device. The monitoring device may be a surveillance camera adapted for outdoor mounting. The monitoring device may be attached to a mounting bracket, which in turn is fixed to a wall or roof structure. The installation of such a monitoring device, which can be large and heavy, may be facilitated by first attaching the monitoring device to the mounting bracket such that the monitoring device is suspended and can hang on its own. An assisting suspension arrangement may be used for this purpose. The suspension arrangement may be integrated on a top surface of the monitoring device's housing.

The suspension arrangement may comprise a hook member attached to the monitoring device. The hook member may be configured to receive a safety wire with a loop extending from the mounting bracket. Thereby the monitoring device can hang on its own while the person installing the monitoring device, also referred to as the monitoring device fitter, connects necessary cables between the monitoring device and the mounting bracket.

When the monitoring device is connected as required, the monitoring device may be fixedly attached to the mounting bracket by screws or the like. The suspension arrangement need not be detached and may function as a safety arrangement if the primary attachment fails or is actively removed. An example of such a suspension arrangement may be seen in the appended FIG. 1.

The suspension arrangement may be equipped with a leaf spring for preventing unintentional unhooking of the safety wire from the hook member. The hook member may be configured to be arranged in an open position for receiving the wire by depressing the leaf spring so as to create a gap between the leaf spring and the hook member. The safety wire is passed through the gap. It may be relatively easy to hook onto the safety wire, but the small gap obtainable by depressing the leaf spring can make unhooking difficult. Tests also show that in some situations the hook member may break, for example because the safety wire hooks onto a part of the leaf spring instead of the hook.

From the above discussion, there is evidently a need for improvement of existing suspension arrangements which are suitable for suspending a monitoring device.

SUMMARY

It is an object of the present invention to provide a suspension arrangement which alleviates the above mentioned and other drawbacks. It is also an object of the present invention to provide a suspension member which is easy to use and which provides a secure engagement of a monitoring device or other device during suspension.

According to a first aspect, the invention is an assisting suspension arrangement for suspending a monitoring device. The suspension arrangement comprises a hook member, a blocking member, and a resilient member. The suspension arrangement is configured to adopt an open state, in which the hook member is arranged to enable engagement with a suspension element for suspending a monitoring device, and a closed state, in which the blocking member is arranged to prevent disengagement of the suspension element from the hook member. The open state and the closed state are enabled by the hook member being movable in relation to the blocking member. The resilient member is arranged to bias the suspension arrangement toward the closed state. The suspension arrangement is configured such that when the monitoring device is suspended by the suspension arrangement, the hook member is adapted to carry the weight of the monitoring device and thereby to transfer the load to the resilient member and to move toward the open state of the suspension arrangement. The suspension arrangement is configured such that when the load of the weight of the monitoring device is released from the hook member, the resilient member is adapted to move the hook member toward the closed state of the suspension arrangement. The monitoring device may be a camera.

An advantage of the invention is that the engagement of the suspension element does not require any interaction between the monitoring device fitter and the suspension arrangement. By applying the weight of the monitoring device to the suspension arrangement, the latter adopts the open state which enables engagement, i.e. enables that the hook member can hook onto the suspension element.

Another advantage of the invention is that the suspension arrangement is further configured such that it adopts the closed state when the monitoring device's weight is released from the suspension arrangement. By this feature, the suspension element is prevented from disengaging from the suspension arrangement. Thus, the monitoring device may be moved around, e.g., for connecting a cable, without any risk of disengaging the suspension element from the suspension arrangement.

Yet another advantage of the invention is that the resilient member provides a damping effect when the monitoring device's weight is applied to and thus impacts the hook member. This effect is due to that the hook member transfers the impact force to the resilient member.

The functions of enabling engagement and preventing disengagement are provided by the location of the blocking member in relation to the hook member in the open state and in the closed state, respectively. These functions may be provided according to the following embodiment. The hook member may comprise a slot being arranged to receive and contain the suspension element. In the closed state, the blocking member prevents passage of the suspension element through the slot, but not in the open state. The slot may comprise an entrance portion, arranged to receive the suspension element, and an engagement portion, arranged to contain the suspension element. In such an embodiment, the blocking member may be arranged to, when the suspension arrangement has adopted the closed state, prevent passage of the suspension element from the entrance portion to the engagement portion or the other way around.

The blocking member may be arranged as an elongated portion extending along and adjacent to an outer surface of the hook member and extending transverse to a side of the slot of the hook member such that the blocking member prevents a suspension element contained in the engagement portion from exiting through the entrance portion.

The blocking member may comprise a corresponding elongated portion being arranged at the other side of the slot, i.e. at the other side of the passage defined by the slot.

The suspension element may comprise a wire. The wire may form a wire loop at its end which is provided for the hook member to engage with, i.e. to hook onto.

As an example of how the suspension element may be engaged by the suspension arrangement, the suspension element may be inserted into the entrance portion of the slot of the hook member in the above disclosed embodiment. The monitoring device is still held by the monitoring device fitter such that no substantial force is applied to the hook member yet. In this position, the monitoring device fitter can let go of the monitoring device. The weight of the monitoring device will then be carried by the engagement between the suspension element and the hook member. The hook member and the blocking member are forced apart by the vertical force from the monitoring device's weight whereby the hook member moves upward in relation to the blocking member. The suspension arrangement thereby adopts the open state. The downward vertical force from the monitoring device's weight has been transferred to the resilient member which is now compressed.

Thanks to the suspension arrangement, the monitoring device fitter is free to use both his/her hands to perform any necessary connections between the wiring of the monitoring device and the wiring of the mounting bracket. The suspension arrangement thereby functions as an assisting suspension arrangement.

When the monitoring device's weight is released from the hook member, the suspension element is free to move around in the slot. However, thanks to the configuration of the suspension arrangement, disengagement of the suspension element from hook member, by exiting the slot, is prevented by the blocking member, since the suspension arrangement adopts the closed state when the monitoring device's weight is released from the hook member. Unintentional disengagement of the wire from the hook member is thereby prevented. The monitoring device fitter can thus move the monitoring device around without having to assure that the wire is not disengaged from the hook member of the suspension arrangement.

In other words, the suspension arrangement is configured such that disengagement of the wire requires an active action. In order to retain the suspension arrangement in the open state, such that the wire can exit the slot, an upward or outward force has to be applied to the hook member such that it is forced away from the blocking member. The upward force has to overcome the downward or inward force provided by the compressed resilient member in the open state.

The slot may be arranged such that when the monitoring device is suspended by the suspension arrangement, the suspension element is forced away from the entrance portion into the engagement portion of the slot. This feature may be achieved by for example that the slot is inclined upward between the entrance portion and the engagement portion.

The slot may comprise an additional portion. Moreover, the suspension arrangement may be arranged to enable the suspension element to enter the additional portion or the entrance portion from the engagement portion when the weight of the monitoring device is released from the hook member. The additional portion provides an alternative movement path for the wire when moving from the engagement portion. This feature lowers the risk that the suspension element disengages from the hook member when the monitoring device's weight is released from the hook member, if the return to the closed state is not as fast as required.

The suspension arrangement may further comprise a foundation member. The foundation member may be provided with a through-hole for receiving the hook member. The blocking member may form part of the foundation member. The hook member may be provided with a base portion arranged to prevent passage of the hook member through the through-hole. Moreover, the resilient member may be arranged between the base portion and the foundation member. In such an embodiment, the resilient member provides a damping effect for the impact force on the hook member when the hook member is loaded with the weight of the monitoring device, compared to if the base portion were to impact directly against the foundation member.

The outer surface of the hook member may be provided with a locking passage. The suspension arrangement may be configured such that the locking passage is exposed in the open state to enable reception of a locking element. The suspension arrangement may further be configured such that the locking passage is covered by the foundation member in the closed state.

Thereby, the suspension arrangement may be prevented from adopting the closed state when the locking element is arranged in the locking passage.

The locking passage may extend transverse to the moving direction of the hook member. Moreover, the locking passage may be arranged to receive a locking element in the form of a pin. When the suspension arrangement is arranged in the open state, a pin may be inserted into the locking passage in such a way that it still extends out from the locking passage. When the force from the monitoring device's weight, or any other force applied to the hook member, is released, the suspension arrangement is prevented from adopting the closed state by the pin bearing against a surface of the foundation member.

In another embodiment, provided for facilitating disengagement of the suspension member, the suspension arrangement further comprises a resilient locking element attached to the foundation member. The hook member is in this embodiment provided with a locking notch. The suspension arrangement may be configured such that the locking element is insertable into the locking notch when the suspension arrangement is arranged in the open state, whereby the suspension arrangement is prevented from adopting the closed state when the locking element is arranged in the locking passage. The locking element is withheld in the locking notch by the resilient member of the suspension arrangement moving the hook member toward the closed state. This downward force acts on the locking element.

In yet another embodiment, provided for facilitating disengagement of the suspension element, an outer side surface of the hook member is provided with a high friction portion. The suspension arrangement is in this embodiment configured such that the high friction portion is exposed in the open state of the suspension arrangement. In the open state, force may be applied to the high friction portion in a radial direction toward the body of the hook member. Thus, the hook member is forced against the foundation member's inner surface of the through-hole. The abutment creates friction which, when the monitoring device's weight is released, prevents the hook member from moving toward the closed state by the resilient member.

In another embodiment of the invention, the slot forms a passage for the suspension element and the passage extends from one side surface of the hook member and past the center axis of the hook member. The blocking member is in this embodiment arranged transverse to the passage of the slot in the closed state of the suspension arrangement such that the blocking member prevents a wire from passing the slot. The blocking member may be positioned so as to be arranged transverse to the passage of the slot regardless of which side of the passage is arranged adjacent the blocking member. The hook member may thereby be arranged in different positions.

In another embodiment of the invention, the hook member is provided with a pair of slots each being arranged to receive and contain said suspension element. The slots comprise entrance portions, which may be located on opposite sides of the hook member's side surface. In this embodiment, the blocking member comprises two blocking portions, which are arranged to prevent the suspension element from passing any of the slots, whereby disengagement of the suspension element from the hook member is prevented. An advantage of this embodiment is that the hook member may be located in a single position, while providing two entrance directions for the wire.

According to a second aspect, the invention is a monitoring device arranged to be suspended. The monitoring device comprises a suspension arrangement according to any embodiment of the first aspect above. The monitoring device may be a camera.

BRIEF DESCRIPTION OF THE DRAWINGS

The above and other aspects of the present invention will now be described in more detail, with reference to the appended drawings showing embodiments of the invention.

DETAILED DESCRIPTION OF THE PREFERRED EMBODIMENTS

The present invention will now be described more fully with reference to the accompanying drawings, in which currently preferred embodiments of the invention are shown. The invention may however be embodied in many different forms and should not be construed as limited to the embodiments set forth herein.

Figure 1:
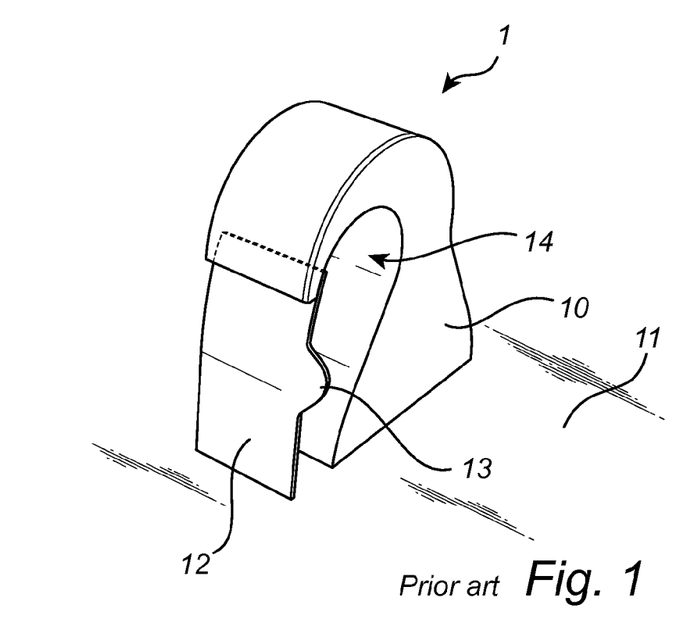
FIG. 1 illustrates a prior art construction of a suspension arrangement.

A prior art construction of a suspension arrangement 1 is illustrated in FIG. 1. The suspension arrangement 1 may be located on a top surface 11 of a monitoring device. The monitoring device may be arranged to be attached to a mounting bracket. The purpose of the suspension arrangement 1 is to enable suspension of the monitoring device from the mounting bracket during, for example, installation of the monitoring device. When the monitoring device is suspended, the monitoring device can hang freely and the monitoring device fitter is free to connect any necessary cables and other connectors between the monitoring device and the mounting bracket. When this is done, the monitoring device fitter may attach the monitoring device to the mounting bracket by means of screws or the like.

The known suspension arrangement 1 comprises a hook member 10. The hook member 10 is attached to a top surface 11 of the monitoring device. The suspension arrangement 1 further comprises a resilient member in the form of a leaf spring 12. The leaf spring 12 is also attached to the top surface 11 of the monitoring device.

The leaf spring 12 is arranged to bias toward a position where it bears against a portion of the hook member 10. The hook member 10, the leaf spring 12 and the top surface 11 of the monitoring device define an interior space 14 in this position as illustrated in FIG. 1. The suspension arrangement 1 is arranged to receive a safety wire (not illustrated) in the interior space 14 by the hook member 10 hooking onto the safety wire. The leaf spring 12 is resilient such that it may, in a loaded state, form a gap between the top of the leaf spring 12 and the hook member 10. The gap provides an entrance for the wire into the interior space 14. The leaf spring 12 may be arranged in the loaded state by depressing the leaf spring 12 inward toward the interior space 14. The leaf spring 12 is provided with a protruding portion 13 for facilitating the depression and assisting the monitoring device fitter when locating the leaf spring 2.

Although the suspension arrangement 1 is fully functional, tests have shown that in some situations there is a risk that the suspension arrangement 1 breaks during use. In particular, the safety wire, when contained in the interior space 14 and when the monitoring device is moved around, may locate itself so as to bear against the protruding portion 13 when the monitoring device is released. In this situation, the monitoring device's weight is carried by the leaf spring 12 instead of by the hook member 10 as intended. The leaf spring 12 may break due to the weight. There is also a risk that the safety wire slips off the protruding portion 13, whereby the monitoring device falls down until the safety wire impacts the upper portion of the hook member 10. In such a situation, the upper portion of the hook member 10 may break due to the impact force.

Moreover, by the design of the suspension arrangement 1, it can be difficult to unhook the safety wire. When the safety wire is located in the interior space 14, unhooking is performed by depressing the leaf spring 12 such that a gap between the upper portion of the leaf spring 12 and the hook member 10 is formed. The safety wire must then be led out of the interior space 14 through the gap, which may be difficult to do while holding the monitoring device at the same time.

Figure 2:
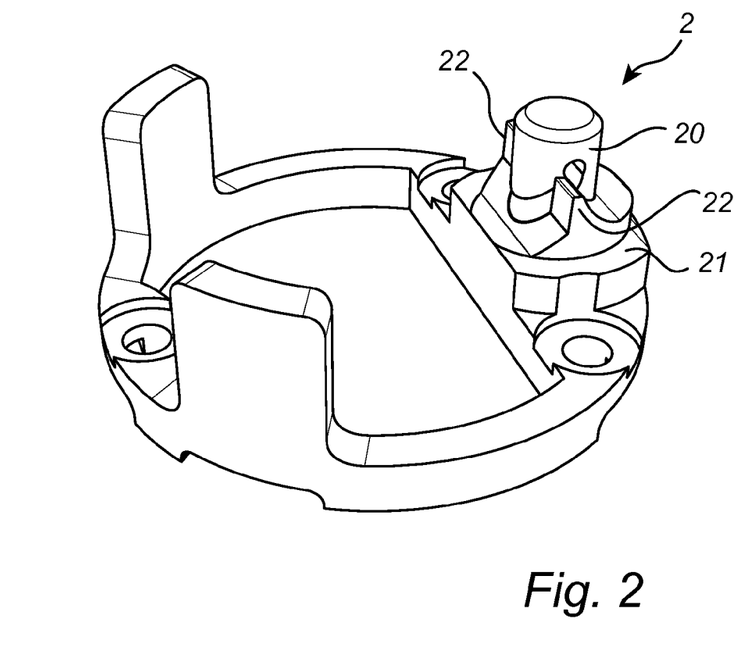
FIG. 2 illustrates a suspension arrangement according to an embodiment of the invention.
Figure 3:
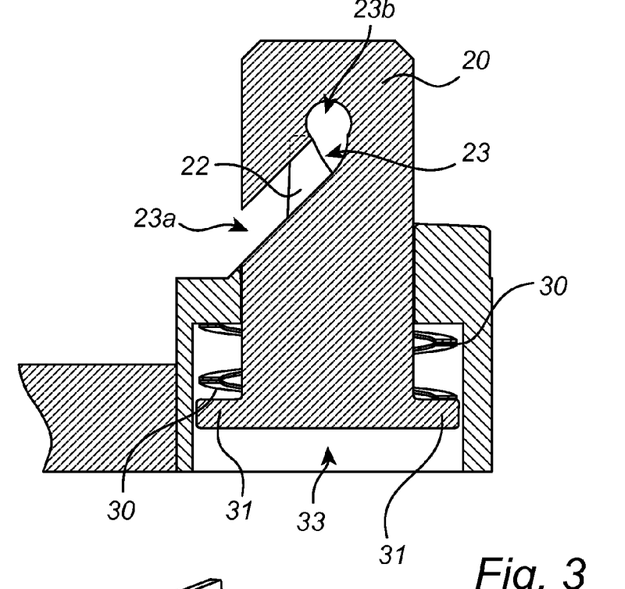
FIG. 3 is a cross-sectional view of the suspension arrangement in FIG. 2.

An improved suspension arrangement 2 according to an embodiment of the invention and with the same purpose, i.e. to provide means for suspending a monitoring device, is illustrated in FIG. 2. FIG. 3 is a cross-sectional view of the suspension arrangement 2.

The suspension arrangement 2 comprises a hook member 20 and a foundation member 21. The suspension arrangement 2 comprises a pair of blocking members 22. However, only one blocking member 22 is necessary for the invention. In this embodiment, each blocking member 22 forms part of the foundation member 21. Through-out the rest of the application, reference will be made only to one blocking member 22 even though a plurality of blocking members may be arranged. The form and function of the blocking member 22 will be disclosed further on.

The hook member 20 forms a separate part, which is insertable into a through-hole 33 of the foundation member 21. The through-hole's 33 shape and size is adapted to the shape of the hook member 20. The hook member 20 is in this embodiment a cylinder shaped element, but could in other embodiments have an edged cross-section or other suitable shapes.

As seen in FIG. 3, the hook member 20 is provided with a slot 23. The slot 23 extends through the body of the hook member 20. The slot 23 forms a passage in which it is arranged to receive a suspension element, such as a wire. To this end, the slot 23 comprises an entrance portion 23a which provides an entrance for the wire from outside the hook member 20 and into the passage of the slot 23. The slot 23 further comprises an engagement portion 23b for containing the wire when completely received in the slot 23.

In order to prevent that the hook member 20 passes the through-hole 33 in the foundation member 21, the hook member 20 comprises a base portion 31. The cross-section of the base portion 31 is arranged such that it cannot pass the through-hole 33. In this embodiment, the base portion 31 forms a flange which extends radially outward from the body of the hook member 20.

By the hook member 20 being separate from the foundation member 21, the hook member 20 is movable in relation to the foundation member 21, and in particular in relation to the blocking member 22.

The suspension arrangement 2 also comprises a resilient member in the form of a wave spring 30. The wave spring 30 is a type of spring also known as coiled wave spring, scrowave spring, or flat wire compression spring. A wave spring may be made out of pre-hardened flat wire which is formed as waves during manufacturing of the spring. A wave spring may be formed with different numbers of turns and waves which defines the spring characteristics.

It is appreciated that other forms of springs are also feasible, such as plate springs and coiled springs. It is also feasible to provide the spring function in the form of an elastomeric material, such as a ring or sleeve of a suitable elastomer, which may be slipped onto the body of the hook member. Hydraulic springs are also possible to use.

The resilient member could be a separate part, as in the illustrated embodiments, or be integrated in either the hook member or in the foundation member of the suspension arrangement.

The embodiments illustrated in the drawings comprise resilient members in the form of wave springs 30. It is appreciated that these wave springs 30 may be substituted by other forms of resilient members, such as the spring types exemplified above.

Returning to FIG. 3, the wave spring 30 forms a closed circle which is slipped onto the body of the hook member 20. When the hook member 20 is positioned in the through-hole 33 of the foundation member 21, the wave spring 30 is arranged between the base portion 31 and the foundation member 21. The wave spring 30 is thereby sandwiched between the base portion 31 and the foundation member 21.

The wave spring 30 is arranged to influence the movement of the hook member 20. By its position, the wave spring 30 is compressed and thus loaded when the hook member is moved upward in the figure. The wave spring 30 thus provides a counteracting downward force when moving the hook member 20 upward in the figure. When the counteracting downward force is no longer overcome by the upward force, the hook member 20 is moved downward in the figure due to decompression of the wave spring 30.

By upward and downward movement is meant, within the context of this application, the hook member's 20 movement in relation to the foundation member 21, and in particular in relation to the blocking member 22. In other words, the upward direction is defined as the direction in which the hook member 20 moves through the through-hole 33, outwardly, toward the open state. The downward direction is defined as the direction in which the hook member 20 moves through the through-hole 33, inwardly, toward the closed state.

It is appreciated that the suspension arrangement does not need to be oriented such that the hook member moves in a strict vertical direction. This orientation is chosen for the illustrated embodiments for facilitating the understanding of the invention. An orientation of the suspension arrangement such that the hook member is movable in relation to the blocking member in essentially the vertical direction is preferred since the force of the monitoring device's weight generally acts in a downward vertical direction.

Returning to FIG. 3, two positions between which the hook member 20 is movable may be defined: a first position in which the wave spring 30 is compressed and a second position in which the wave spring 30 is relaxed when compared to the first position.

It is appreciated that the wave spring 30 does not need to be fully relaxed in the second position. The suspension arrangement 2 may, for example, be arranged such that the wave spring 30 is slightly compressed in the second position.

Two states of the suspension arrangement are defined within the context of this application: an open state and a closed state. In the open state, the hook member 20 is arranged in the first position and the suspension arrangement 2 is configured to enable engagement between the hook member 20 and a suspension member. In the closed state, the hook member 20 is arranged in the second position and the suspension arrangement 2 is configured to prevent disengagement of the suspension element from the hook member 20.

The functions of enabling engagement and preventing disengagement are provided by the location of the blocking member 22 in relation to the hook member 20 in the open state and in the closed state, respectively.

The open state and closed state of the suspension arrangement 2 will now be disclosed in detail with reference to FIGS. 4a-4d illustrating an example of how to use the suspension arrangement 2.

Figure 4A:
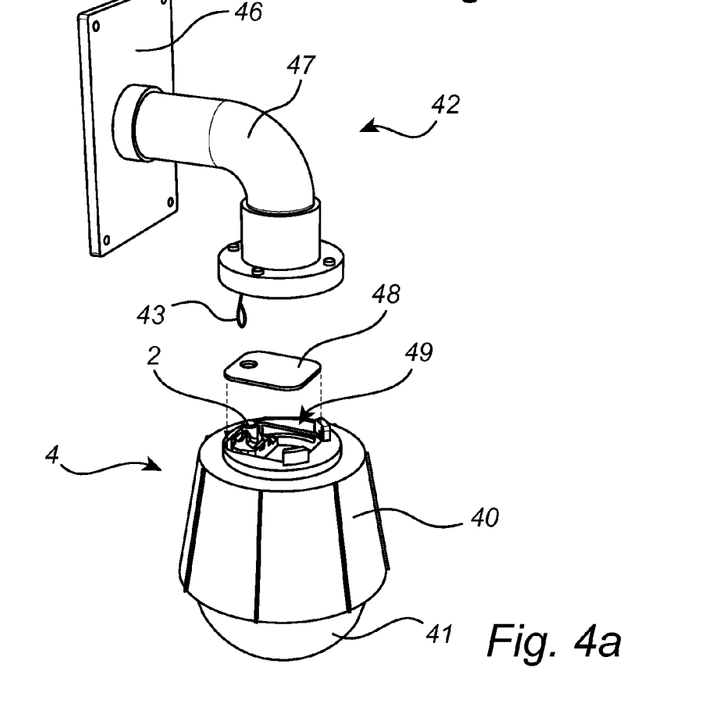
FIGS. 4a-4d illustrate engagement and disengagement of a suspension element in a suspension arrangement according to an embodiment of the invention.

A monitoring device in the form of a camera 4 comprising a camera housing 40 and a camera dome 41 is illustrated in FIG. 4a. The term camera is within the context of this application to be construed as a camera module or a camera arrangement which may comprise components other than a camera unit, such as housing components, connectors, processors, lighting arrangements, lenses or other optical components, etc.

The camera 4 is arranged to be installed as a suspended camera. For this purpose, a mounting bracket 42 is provided. The mounting bracket 42 is arranged to provide attachment of the camera 4 to a mounting surface. The mounting surface is a wall in this example, but could be other surfaces such as a ceiling or soffit structure. The mounting bracket 42 and camera 4 may be installed in an indoor or in an outdoor environment.

The mounting bracket 42 comprises a mounting portion 46 arranged to be fixed to the wall, by means of, e.g., screws. The mounting bracket 42 further comprises a camera arm 47 which is arranged to connect to the camera 4. The camera arm 47 may house power cords and other wiring to be connected to the camera 4.

The top surface of the camera housing 40 is provided with a cover 48 covering an opening 49 in a top surface of the camera housing 40. The opening 49 provides access to wiring located in the interior of the camera 4 which is to be connected to the wiring of the mounting bracket's 42 camera arm 47. Hence, no wiring or connections need to be located neither outside the mounting bracket 42 nor outside the camera 4. The wiring and cable connections are thus protected from influences from the outside, such as rain or physical damage.

In order to provide this protection, the wiring in the interior of the camera housing 40 must be connected to the wiring in the mounting bracket 42 before the camera housing 40 is attached to the camera arm 47. The suspension arrangement 2 assists in this process. The mounting bracket 42 is provided with a suspension element in the form of a wire 43 and the camera 4 is provided with the suspension arrangement 2. The suspension arrangement 2 may be provided outside or within the opening 49.

The wire 43 is here provided with a wire loop at its end. The wire loop enables engagement to the hook member 20 by the hook member 20 hooking onto the wire loop. The material of the wire may be metal, a polymeric material, or an organic material, such as hemp.

The suspension arrangement 2 in combination with the wire 43 allows the camera 4 to be suspended in the mounting bracket 42 and to hang by itself, without the need for the camera fitter to hold the camera 4. The camera fitter may thereby be free to use both his/her hands to perform the necessary connections between the wiring of the camera 4 and the wiring of the mounting bracket 42. When these are accomplished, the camera fitter may lift up the camera 4 and attach it to the camera arm 47 of the mounting bracket 42. The attachment may be performed by screws or the like.

Figure 4B:
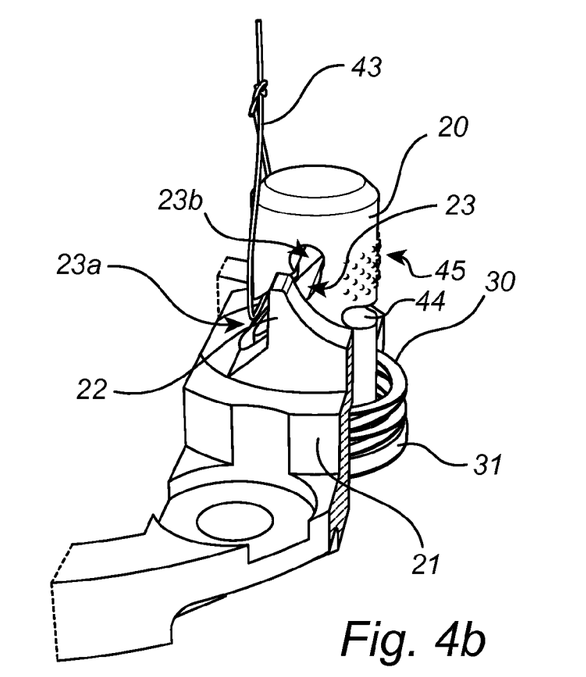
Figure 4C:
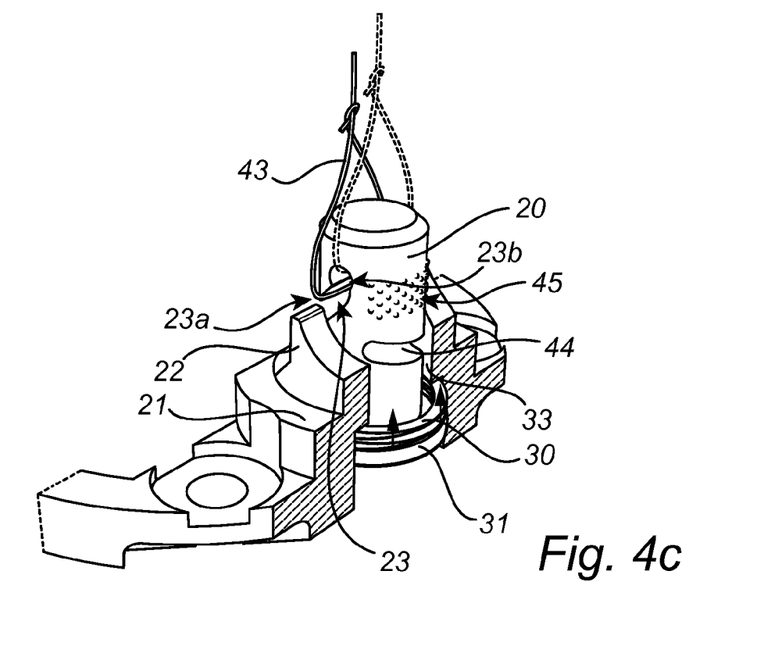
Figure 4D:
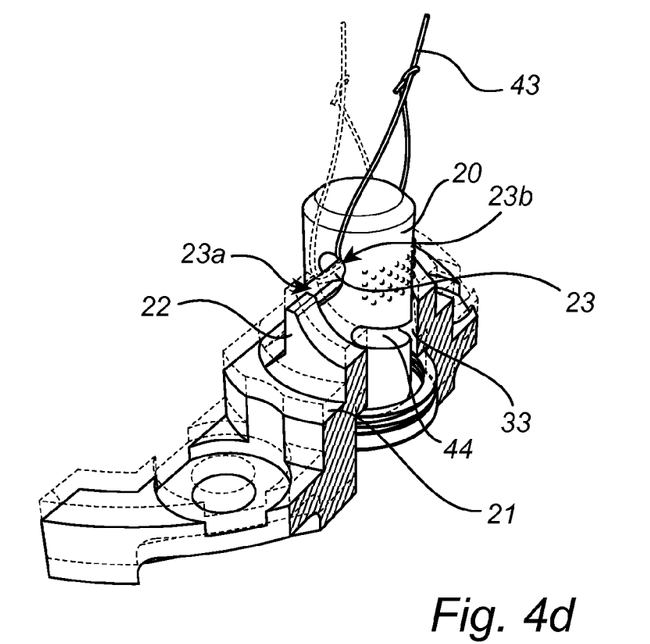

Going more into detail, the engagement between the hook member 20 and the wire 43 and the function of the blocking member 22 will now be disclosed with reference to FIGS. 4b-4d.

As disclosed earlier, the suspension arrangement 2 is configured to adopt the closed state when no upward force is applied to the hook member 20. In the closed state, the hook member 20 and the blocking member 22 are located in relation to each other such that the blocking member 22 prevents passage of the wire 43 through the slot 23. By passage is meant passage from the entrance portion 23a to the engagement portion 23b or the other way around.

In the embodiment illustrated in FIGS. 4b-4c, the blocking member 22 comprises an elongated portion extending along and adjacent to an outer surface of the hook member's 20 body. The blocking member 22 extends transverse to a side of the slot 23, meaning that the blocking member 22 extends transverse to a side of the passage which the slot 23 forms for the wire 43. As previously mentioned, the suspension arrangement 2 may comprise a further blocking member extending along the other side of the slot 23, i.e. along the other side of the passage.

The gap distance between the blocking member 22 and the hook member 20 is adapted such that the particular suspension member used cannot pass the gap. A small gap is preferred, instead of the blocking member 22 abutting against the hook member 20, in order to not create any friction between the hook member 20 and the blocking member 22.

The blocking member 22 is arranged transverse to an intermediate portion of the slot 23 between the entrance portion 23a and the engagement portion 23b. The wire 43 may thereby be arranged in the entrance portion 23a of the slot 23 when the suspension arrangement 2 is still arranged in the closed state. This is illustrated in FIG. 4b, where the wire 43 has been inserted into the entrance portion 23a of the slot 23. The camera 4 is still held by the camera fitter such that no substantial force is applied to the hook member 20 yet. In this position, the camera fitter can let go of the camera 4. The weight of the camera 4 will then be carried by the engagement between the wire 43 and the hook member 20. The hook member 20 and the foundation member 21 are forced apart by the downward vertical force from the camera's weight, whereby the hook member 20 moves upward in relation to the blocking member 22. The suspension arrangement 2 thereby adopts the open state which is illustrated in FIG. 4c. The downward vertical force from the camera's 4 weight has been transferred to the wave spring 30 which is now compressed.

In the open state, the wire 43 is allowed to pass the slot 23 from the entrance portion 23a to the engagement portion 23b. Due to that the slot 23 is inclined upward from the entrance portion 23a to the engagement portion 23b, the wire 43 is forced away from the entrance portion 23a into the engagement portion 23b of the slot 23 when the camera fitter lets go of the camera 4.

When the wire 43 is received in the engagement portion 23b the hook member 20 is exposed to an impact force. The suspension arrangement 2 is configured such that the impact force exerted on the hook member 20 is transferred to the wave spring 30. The wave spring 30 thereby provides a damping effect for the impact when the hook member 20 is loaded with the weight of the camera 4, compared to if the base portion 31 were to impact directly against the foundation member 21.

FIG. 4d illustrates how the suspension arrangement 2 acts when the force from the camera's 4 weight is released from the hook member 20. The solid lines of the wire 43 and of the suspension arrangement represent the open state of the suspension arrangement 2, in which the hook member 22 carries the camera's weight. The broken lines of the wire 43 and of the suspension arrangement represent the closed state of the suspension arrangement 2, in which the camera's weight is released from the hook member 22. Due to the compression of the wave spring 30 in the closed state, the wave spring 30 is arranged to bias the suspension arrangement 2 toward the closed state.

When the camera's weight is released from the hook member 20, the wire 43 is no longer forced into the engagement portion 23b and may move along the slot 23. However, thanks to the configuration of the suspension arrangement 2, exit of the wire 43 from the slot 23 through the entrance portion 23a is prevented by the blocking member 22 since the suspension arrangement 2 adopts the closed state when the camera's weight is released from the hook member 20. Unintentional disengagement of the wire from the hook member 20 is thereby prevented. The camera fitter can thus move the camera around without having to assure that the wire 43 is not disengaged from the hook member 20 of the suspension arrangement 2.

In other words, the suspension arrangement 2 is configured such that disengagement of the wire 43 requires an active action. In order to retain the suspension arrangement 20 in the open state, such that the wire 43 can exit the slot 23, an upward force has to be applied to the hook member 20 such that it is forced away from the blocking member 22. The upward force has to overcome the downward force provided by the compressed wave spring 30 in the open state. One example is that the camera fitter pulls the hook member 20 in the upward direction, so as to arrange the suspension arrangement 2 in the open state, while leading the wire 43 out from the slot 23.

Another example of how to disengage the wire 43 from the slot 23 will be disclosed with reference to FIG. 4c. Here, the hook member 20 is provided with a high friction portion 45 which facilitates the disengagement of the wire 43. The high friction portion 45 is located at a position which is exposed when the suspension arrangement 2 adopts the open state. In the open state, the fitter may apply force to the high friction portion 45 in a radial direction toward the body of the hook member 20. Thus, the hook member 20 is forced against the foundation member's 21 inner surface of the through-hole 33. The forced abutment creates friction which, when the camera's weight is released, prevents the hook member 20 from moving toward the closed state by the wave spring 30. The high friction portion 45 could for example be a grooved, knurled, or roughed surface portion. Force may be applied to the high friction portion 45 by pressing a tool or a finger against it. When the wire 43 has been disengaged, the force applied to the high friction portion 45 may be released whereby the suspension arrangement 2 adopts the closed state.

The hook member 20 of FIG. 4c is also provided with a locking passage 44. The locking passage 44 may form an alternative or a complement to the high friction portion 45. The locking passage 44 is arranged at a position on the hook member 40 such that the locking passage 44 is exposed in the open state and covered by the foundation member in the closed state. In other words, the portion of the hook member 20 which is provided with the locking passage 44 is located in the through-hole 33 of the foundation member 21 when the suspension arrangement adopts the closed state. The locking passage 44 extends in a tangential direction in view of the hook member's 20 cross-sectional circumference. Alternatively, the locking passage 44 may extend in a radial direction in view of the hook member's 20 cross-section or in a shifted direction thereof.

The locking passage 44 is configured to receive a locking element in the form of a pin (not illustrated). When the suspension arrangement 2 is arranged in the open state, the pin is inserted into the locking passage 44 in such a way that it still extends out from the locking passage 44. When the force from the camera's 4 weight, or any other force applied to the hook member 20, is released, the suspension arrangement is prevented from adopting the closed state by that the pin bear against a surface of foundation member 21. The wire 43 can thus be removed from the slot 23 without the need for applying any active force on the hook member 20. When the wire 43 has been disengaged, the pin may be removed from the locking passage whereby the suspension arrangement adopts the closed state. The pin may be provided with a conspicuous flag, or be designed in a conspicuous colour, in order to reduce the risk of the fitter forgetting to remove it after use. The pin may be attached to the suspension arrangement 2, e.g. to a portion of the foundation member 21 for making the pin easily accessible.

The suspension arrangement is in the disclosed embodiment is arranged to be provided on the top surface of a camera 4. It is appreciated that the suspension arrangement 2 may alternatively be located in the mounting bracket 42 or in a corresponding arrangement to which the camera 4 is to be attached. The suspension member, in this example the wire 43, would in that case be attached to the camera 4.

Figure 5:
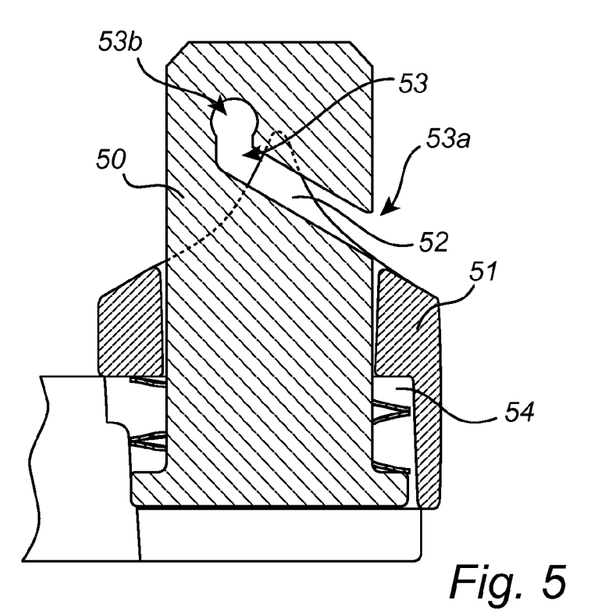
FIGS. 5-8 are cross-sectional views of different embodiments of the suspension arrangement.

A blocking member 52 according to an alternative embodiment will now be disclosed with reference to FIG. 5. FIG. 5 is a cross-sectional view looking in the extension direction of the slot 53. The slot 53 forms a passage for the suspension element, here in the form of a wire. The passage extends from the entrance portion 53a to the engagement portion 53b. The passage extends past the center axis of the hook member 50. The blocking member 52 is arranged transverse to the passage of the slot 53 so as to prevent a wire from passing the passage when the suspension arrangement is arranged in the closed state, as it is in FIG. 5. In this embodiment, the blocking member 52 is positioned so as to be arranged transverse to the passage of the slot 53 regardless of which side of the passage is arranged adjacent the blocking member 52. In other words, the suspension arrangement is configured such that the hook member 53 may be arranged with its entrance portion 53a either facing inward and toward the center of the foundation member 51 or facing outward and away from the center of the foundation member 52, as in the illustrated embodiment. Looking at the suspension arrangement 2 of FIG. 2, the hook member 20 in that embodiment is arranged such that the engagement portion 23a faces inward and toward the center of the foundation member 21. In either of the mentioned positions, the blocking member 52 prevents passage of a wire through the passage of the slot 53.

The hook member 20 may thereby be arranged in different positions. Depending on for example the suspension arrangement's position on the monitoring device, it may be preferred to locate the hook member 50, and thereby the entrance portion 53a of the slot 53, differently in order to facilitate the engagement of the suspension member.

The base portion of the hook member 50 may be configured so as to guide the hook member 50 into one of the positions. For example, the shape of the base portion's circumference may be chosen such that it fits uniquely into a corresponding recess arranged for the base portion and provided as a part of the through-hole 54 of the foundation member 21. For the embodiment in FIG. 5, where the hook member 50 may be arranged in two positions, the base portion and the corresponding recess may be arranged such that both positions are feasible.

Figure 6:
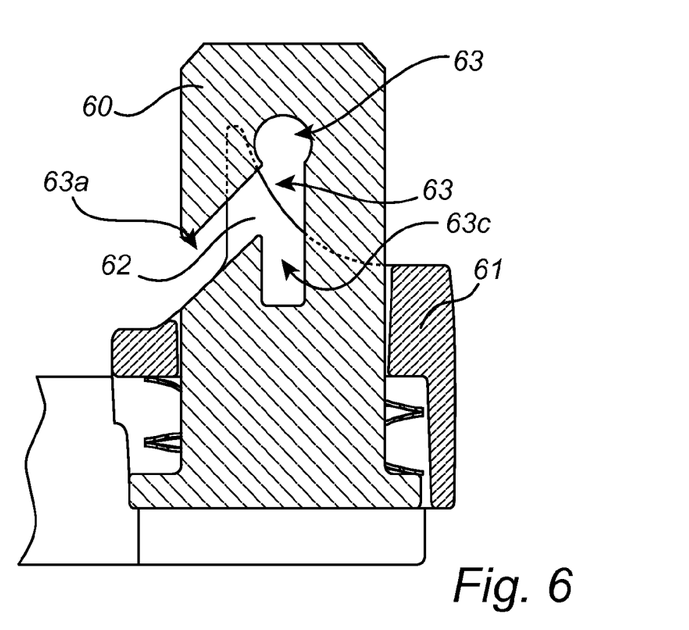

Another embodiment of a hook member 60 is illustrated in FIG. 6. The slot 63 of the hook member 60 comprises an entrance portion 63a and an engagement portion 63b, corresponding to the above disclosed configurations of hook members. The slot 63 also comprises an additional portion 63c. The additional portion 63c is arranged in connection with the engagement portion 63b such that a wire may move within the slot 63 from the engagement portion 63b into the additional portion 63c. The additional portion 63c has no opening through which the wire can exit the slot 63.

The purpose of the additional portion 63c is to provide an alternative movement path to the entrance portion 63a for the wire when moving from the engagement portion 63b. This feature lowers the risk of the wire exiting the slot 63 when the monitoring device's weight is released from the hook member 60, if the return to the closed state is not as fast as required. For example, a resilient member with a low stiffness constant provides a situation where a low force is required to arrange the suspension arrangement 2 in the open state and where the return to the closed state is slower when compared to if a resilient member of a higher stiffness constant is used. When a resilient member with a low stiffness constant is used, an additional portion 63c may be utilized for counteracting the drawbacks of a slow return.

The additional portion 63c is in this embodiment arranged along the extension direction of the hook member 60. This feature increases the likeliness that the wire enters the additional portion 63c, instead of exiting through the entrance portion 63a, when the monitoring device is lifted in the direction of the extension direction.

Figure 7:
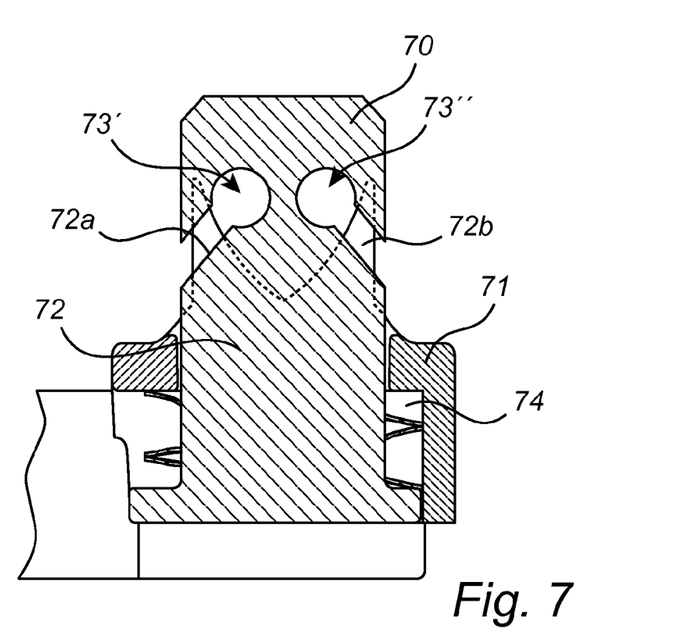

Yet another embodiment of a hook member 70 is illustrated in FIG. 7. The hook member 70 is provided with two slots 73' and 73". The slots 73', 73" are located with their entrance portions on opposite sides of the hook member's 70 side surface. The slots 73', 73" are not connected to each other.

This embodiment is an alternative to the embodiment illustrated in FIG. 5, where the hook member 50 may be positioned in different positions in order to locate the entrance portion 53a such that it faces different directions.

The blocking member 72 comprises two blocking portions 72a and 72b. Each of the blocking portions 72a, 72b prevents, in the closed state, a wire from exiting each of the slots 73', 73", respectively. The function and form of the blocking member 72 and of each of the blocking portion 72a, 72b may otherwise accord with blocking members of previously disclosed embodiments.

By the configuration of the hook member 70 and the blocking member 72, the hook member 70 may be located in a single position in the through-hole 74 of the foundation member 71, while providing two entrance directions for the wire. It is thereby not required to reposition the hook member 70 in order to change the entrance direction for the suspension element from one to another.

Figure 8:
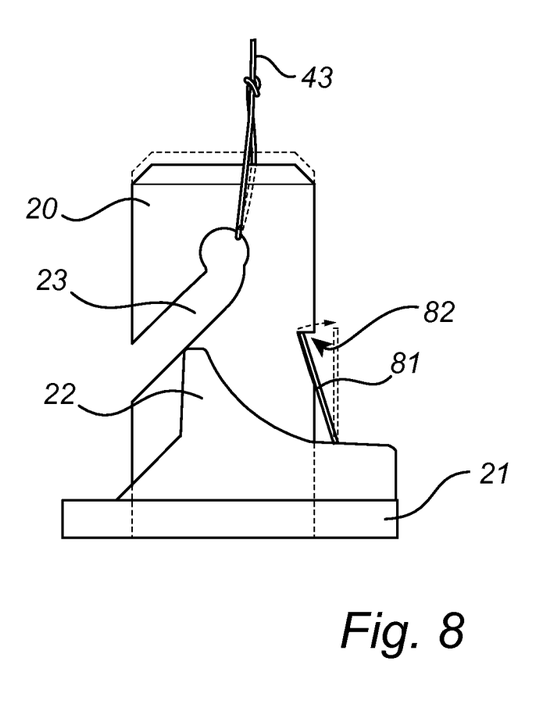

An alternative embodiment of the hook member 21, with respect to locking the suspension arrangement 2 in the open state, is illustrated in FIG. 8. The hook member 20 comprises a slot 23 according to previously disclosed embodiments. The foundation member 21 with the blocking member 22 may be arranged according to previously disclosed embodiments. The foundation member 21 is further provided with a locking element 81. The locking element 81 has the form of a resilient pin or strip which is attached to an upper surface of the foundation member 21. The hook member 20 is provided with a locking notch 82. The locking notch 82 is provided on a portion of the hook member 20 which is exposed when the suspension arrangement is arranged in the open state.

The locking element 81 and the locking notch 82 are located in relation to each other such that the locking element 81 is insertable into the locking notch 82 when the suspension arrangement is arranged in the open state. By the locking element 81 being resilient, the locking element 81 may be bent for insertion into the locking notch 82 while still being attached to the foundation member 21. The locking element 81 could for example comprise a leaf spring element. The locking notch 82 and the locking element 81 may be provided in other forms and configurations.

The locking arrangement in FIG. 8 may be arranged to provide a temporary locking of the hook member 20 which is released when the monitoring device is released. This function is provided by the suspension arrangement 2 being arranged such that the locking element 81 is insertable into the locking notch 82 when the hook member 82 is not moved fully toward the open state, however enough so that the blocking member 22 does not fully prevent passage of the wire 43 in the slot 23. The suspension arrangement is thus in its open state in the locked position. The locking element 81 is maintained in the locking notch 82 by the wave spring (not illustrated) of the suspension arrangement moving the hook member 20 toward the closed state. This downward force acts on the locking element 81.

When an upward force, which is opposite to and overcomes the downward force of the wave spring 30, is applied to the hook member 20, by for example the monitoring device's weight, the hook member 20 moves further into the open state. This position is represented by the dashed lines in FIG. 8. In this position, the locking element 81 will no longer be maintained in the locking notch 82 since the decompression force of the wave spring 30 is now not strong enough to move the hook member 20 toward the closed state. The locking element 81 is arranged to be biased toward a relaxed state which in this embodiment is an upright state. This state is indicated by the dashed lines in FIG. 8. Due to this configuration, the locking element 81 will return to its relaxed state when the hook member 20 carries the weight of the monitoring device or is exposed to a corresponding upward force. When the upward force is released, provided that the locking element 81 is not re-inserted into the locking notch 82, the suspension arrangement will adopt the closed state.

The temporary locking may be used when it is desired to temporary disengage and re-engage the wire 43. Another use of the temporary locking is to arrange the suspension arrangement 2 in the locked position before commencing the mounting process, in order to facilitate the engagement. The monitoring device could for example be delivered with the suspension arrangement in the locked position.

When an understanding of the principles of the invention now has been given, it should also be appreciated that the suspension arrangement may be realized in various forms within the scope of invention according to the claims.

It is appreciated that various forms of springs with different stiffness constant can be chosen. A high stiffness constant provides a good damping effect when the force from the monitoring device's weight impacts the hook member. On the other hand, with a high stiffness constant a greater force is required to move the hook member toward the open state. In that case, the embodiments of FIG. 4b (with a locking passage 44 and a pin) and FIG. 8 (with a locking notch 82 and a locking element 81) may facilitate disengagement of the wire. Hence, the choice of spring and its characteristics is flexible and depends on the application and the desired properties of the suspension arrangement. The choice also depends on the type of monitoring device that the suspension arrangement is to be used with. A monitoring device, such as a camera, arranged for suspension may have a weight of 3-8 kg; however the suspension arrangement may be used for both lighter and heavier constructions by adapting its configuration. One control factor for the design is for example that the spring is chosen such that the vertical force from the monitoring device's weight when carried by the hook member is large enough to overcome the downward force of the spring which acts to move the hook member toward the closed state.

The material of the suspension arrangement's components should also be chosen based on the loads it is intended to bear. For suspending light devices, such as a small camera, the suspension arrangement, including the foundation member (with the blocking member), the hook member and the resilient member, may be made in a polymeric material, such as plastics or rubber. Plastic materials, for example, have the advantage that they are inexpensive. However, the material does not sustain as high loads as some other materials. For suspending heavier devices, the suspension arrangement may be made in a metal material, such as steel or aluminum.

In the embodiments shown on the drawings, the suspension element is in the form of a loop on a wire. However, the suspension element may as well take other forms. For instance, a bulge or ball may be attached to or formed on the wire. The hook member may in such case be formed with an undercut groove into which the bulge or ball is insertable, and which has an end wall not allowing the bulge or ball to pass out of the groove when the monitoring device is suspended. It may also be possible to use a wire without a loop, and lock the suspension element in the hook member by means of a spring-loaded ball lock mechanism. Further, instead of a wire, a band of elastomeric or plastic material, optionally comprising a metallic cord may be used. A hook, not forming a complete loop, of thicker material could also be used as suspension element.

The hook member need not necessarily be made in one piece. Instead, it may be made up of two or more parts, of one or more materials. For instance, an upper part of the hook member, comprising the slot, may be made of one material, and a lower part, comprising the base portion, may be made of another material. One of the parts may, e.g., be screwed into the other part by a threaded engagement. The shape of the hook member is not limited to the ones shown on the drawings. The hook member may take any form suitable for engaging and retaining the respective suspension element that is being used.

Above, the invention has been described in connection with a camera. However, other monitoring devices, such as IR detectors and microphones, may also be suspended using a suspension arrangement according to the invention.

It is also appreciated that the suspension member may be used for other applications than suspending a monitoring device. For instance, it may be used for suspending stage equipment, such as spotlights. The suspension arrangement could be increased or decreased in size in order to fit the particular application.

Another suspension arrangement based on the same principles as the already disclosed embodiments will now be described. The suspension arrangement comprises a hook member, a foundation member and a blocking member. The hook member comprises a slot. The suspension arrangement differs from the above disclosed embodiments in that the hook member forms part of, or is at least fixedly attached to, the foundation member. The blocking member is arranged at least partly around the hook member, as disclosed previously. The suspension arrangement is configured such that the blocking member is movable in relation to the hook member. This feature may be achieved by the suspension arrangement comprising a resilient member which is provided as a connection between the blocking member and the foundation member. The suspension arrangement may be configured such that the resilient member biases the blocking member toward the closed state. The meaning of closed and open state is the same as for previously disclosed embodiments. The suspension arrangement may adopt the open state by that a force, which counteracts the biasing force of the resilient member, is applied to the blocking member. The blocking member transfers the counteracting force to the resilient member which thereby is compressed. A wire, or other suspension element, may in the open state be arranged in the slot of the hook member. The blocking member may thereafter be released whereby the resilient element moves the blocking member toward the closed state of the suspension arrangement.

What is claimed is:

1. An assisting suspension arrangement for suspending a monitoring device, the suspension arrangement comprising:
    a hook member;
    a blocking member; and
    a resilient member;
    wherein the suspension arrangement is configured to adopt an open state, in which the hook member is arranged to enable engagement with a suspension element for suspending a monitoring device, and a closed state, in which the blocking member is arranged to prevent disengagement of the suspension element from the hook member;
    wherein the open state and the closed state are enabled by the hook member being movable in relation to the blocking member;
    wherein the resilient member is arranged to bias the suspension arrangement toward the closed state;
    wherein the suspension arrangement is configured such that when the monitoring device is suspended by the suspension arrangement, the hook member is adapted to carry the weight of the monitoring device and thereby to transfer the load to the resilient member and to move toward the open state of the suspension arrangement;
    wherein the suspension arrangement is configured such that when the load of the weight of the monitoring device is released from the hook member, the resilient member is adapted to move the hook member toward the closed state of the suspension arrangement;
    wherein the hook member is provided with a slot being arranged to receive and contain the suspension element; and
    wherein the blocking member comprises an elongated portion extending along and adjacent to an outer surface of the hook member and transverse to a side of the slot of the hook member such that the blocking member prevents a suspension element contained in an engagement portion from exiting through an entrance portion.

2. The suspension arrangement of claim 1,
    wherein the slot comprises an entrance portion, arranged to receive the suspension element from outside the hook member, and an engagement portion, arranged to contain the suspension element; and
    wherein the slot is arranged such that when the monitoring device is suspended by the suspension arrangement, the suspension element is forced away from the entrance portion into the engagement portion of the slot.

3. The suspension arrangement of claim 2,
    wherein the slot comprises an additional portion; and
    wherein the suspension arrangement is arranged to enable the suspension element to enter the additional portion or the entrance portion from the engagement portion when the weight of the monitoring device is released from the hook member.

4. The suspension arrangement of claim 1, wherein the blocking member comprises a corresponding elongated portion being arranged at an other side of the slot.

5. The suspension arrangement of claim 1, further comprising a foundation member provided with a through-hole for receiving the hook member,
    wherein the hook member is provided with a base portion arranged to prevent passage of the hook member through the through-hole; and
    wherein the resilient member is arranged between the base portion and the foundation member.

6. The suspension arrangement of claim 5, wherein the blocking member forms part of the foundation member.

7. The suspension arrangement of claim 5,
    wherein the outer surface of the hook member is provided with a locking passage; and
    wherein the suspension arrangement is configured such that the locking passage is exposed in the open state to enable reception of a locking element and such that the locking passage is covered by the foundation member in the closed state, whereby the suspension arrangement is prevented from adopting the closed state when the locking element is arranged in the locking passage.

8. The suspension arrangement of claim 7,
    wherein the locking passage extends transverse to a moving direction of the hook member; and
    wherein the locking passage is arranged to receive a locking element in the form of a pin.

9. The suspension arrangement of claim 5, further comprising a resilient locking element attached to the foundation member,
    wherein the hook member is provided with a locking notch; and
    wherein the suspension arrangement is configured such that the locking element is insertable into the locking notch when the suspension arrangement is arranged in the open state, whereby the suspension arrangement is prevented from adopting the closed state when the locking element is arranged in a locking passage.

10. The suspension arrangement of claim 1,
    wherein an outer side surface of the hook member is provided with a high friction portion; and wherein the suspension arrangement is configured such that the high friction portion is exposed in the open state of the suspension arrangement.

11. The suspension arrangement of claim 1,
wherein the slot forms a passage for the suspension element;
wherein the passage extends from one side surface of the hook member and past the center axis of the hook member;
wherein the blocking member is arranged transverse to the passage of the slot in the closed state of the suspension arrangement such that the blocking member prevents a wire to pass the slot; and
wherein the blocking member is positioned so as to be arranged transverse to the passage of the slot regardless of which side of the passage is arranged adjacent the blocking member.

12. The suspension arrangement of claim 1,
wherein the hook member is provided with a pair of slots each being arranged to receive and contain the suspension element;
wherein the slots comprise entrance portions which are located on opposite sides of a side surface of the hook member;
wherein the blocking member comprises two blocking portions; and
wherein the blocking portions are arranged to prevent the suspension element from passing any of the slots, whereby disengagement of the suspension element from the hook member is prevented.

13. A monitoring device arranged to be suspended, the monitoring device comprising the suspension arrangement of claim 1.

14. A monitoring device arranged to be suspended, the monitoring device comprising a suspension arrangement, the suspension arrangement comprising:
a hook member;
a blocking member; and
a resilient member;
wherein the suspension arrangement is configured to adopt an open state, in which the hook member is arranged to enable engagement with a suspension element for suspending a monitoring device, and a closed state, in which the blocking member is arranged to prevent disengagement of the suspension element from the hook member;
wherein the open state and the closed state are enabled by the hook member being movable in relation to the blocking member;
wherein the resilient member is arranged to bias the suspension arrangement toward the closed state;
wherein the suspension arrangement is configured such that when the monitoring device is suspended by the suspension arrangement, the hook member is adapted to carry the weight of the monitoring device and thereby to transfer the load to the resilient member and to move toward the open state of the suspension arrangement;
wherein the suspension arrangement is configured such that when the load of the weight of the monitoring device is released from the hook member, the resilient member is adapted to move the hook member toward the closed state of the suspension arrangement;
wherein the hook member is provided with a slot being arranged to receive and contain the suspension element; and
wherein the blocking member comprises an elongated portion extending along and adjacent to an outer surface of the hook member and transverse to a side of the slot of the hook member such that the blocking member prevents a suspension element contained in an engagement portion from exiting through an entrance portion.

* * * * *